United States Patent
Traub et al.

[11] Patent Number: 6,058,377
[45] Date of Patent: May 2, 2000

[54] PORTFOLIO STRUCTURING USING LOW-DISCREPANCY DETERMINISTIC SEQUENCES

[75] Inventors: Joseph F. Traub, New York; Spassimir Paskov, Scarsdale, both of N.Y.; Irwin F. Vanderhoof, Towaco, N.J.; Anargyros Papageorgiou, New York, N.Y.

[73] Assignee: The Trustees of Columbia University in the City of New York, New York, N.Y.

[21] Appl. No.: 09/020,733

[22] Filed: Feb. 9, 1998

Related U.S. Application Data

[63] Continuation-in-part of application No. 08/902,921, Jul. 30, 1997, which is a continuation of application No. 08/285,902, Aug. 4, 1994, abandoned.

[51] Int. Cl.[7] .................................................. G06F 17/60
[52] U.S. Cl. .................................. 705/36; 705/35; 705/38
[58] Field of Search .................................. 705/35, 36, 38

*Primary Examiner*—Allen R. MacDonald
*Assistant Examiner*—Susanna Meinecke-Díaz
*Attorney, Agent, or Firm*—Baker & Botts, L.L.P.

[57] ABSTRACT

In securities valuation, in setting the initial offering price of a financial instrument, or in later revaluation as financial parameters such as interest rates may change, an estimate of the value of the instrument may be represented as a multi-dimensional integral. For evaluation of the integral, numerical integration is preferred with the integrand being sampled at deterministic points having a low-discrepancy property. The technique produces approximate values at significant computational savings and with greater reliability as compared with the Monte Carlo technique. Further to estimating the value of a complex security, sampling at points of a low-discrepancy deterministic sequence can be used in estimating value at risk in portfolio structuring.

18 Claims, 7 Drawing Sheets

PORTFOLIO STRUCTURING USING LOW-DISCREPANCY DETERMINISTIC SEQUENCES

This application is a continuation-in-part of pending application Ser. No. 08/902,921, still pending, which was filed Jul. 30, 1997 as a continuation application of now-abandoned application Ser. No. 08/285,902 filed Aug. 4, 1994.

The United States Government has certain rights to this invention pursuant to grants CCR-91-14042 and IRI-92-12597 awarded by the National Science Foundation, and to grant AFOSR-91-0347 awarded by the U.S. Air Force.

BACKGROUND OF THE INVENTION

The invention relates to portfolio structuring and, more particularly, to structuring of a portfolio including assets/liabilities such as real estate, stocks, bonds, futures, options, collateralized mortgage obligations, single-premium deferred annuities and insurance contracts.

Portfolio structuring includes transactions such as buying, holding and selling of assets/liabilities, as well the adoption, continuation, modification or termination of transaction strategies. Typically, decisions concerning transactions and strategies are based on the evaluation of one or several complicated functions of a large number of variables such as a multi-dimensional integral or the inverse of a distribution function, for example.

In financial securities transactions, which includes the initial sale, the value of a security may be estimated, e.g., based on expected future cash flow. Such cash flow may depend on variable interest rates, for example, and these and other relevant variables may be viewed as stochastic variables.

It is well known that the value of a financial security which depends on stochastic variables can be estimated in terms of a multi-dimensional integral. The dimension of such an integral may be very high.

In collateralized mortgage obligations (CMO), for example, instruments or securities variously called tranches, shares, participations, classes or contracts have cash flows which are determined by dividing and distributing the cash flow of an underlying collection or pool of mortgages on a monthly basis according to pre-specified rules. The present value of a tranche can be estimated on the basis of the expected monthly cash flows over the remaining term of the tranche, and an estimate of the present value of a tranche can be represented as a multi-dimensional integral whose dimension is the number of payment periods of the tranche. For a typical instrument with a 30-year term and with monthly payments, this dimension is 360.

Usually, such a high-dimensional integral can be evaluated only approximately, by numerical integration. This involves the generation of points in the domain of integration, evaluating or "sampling" the integrand at the generated points, and combining the resulting integrand values, e.g., by averaging. Well known for numerical integration in securities valuation is the so-called Monte Carlo method in which points in the domain of integration are generated at random.

With integrands arising in financial securities valuation, the computational work in combining the sampled values is negligible as compared with producing the integrand values. Thus, numerical integration methods in securities valuation may be compared based on the number of samples required for obtaining a sufficiently accurate approximation to the integral.

Sampling techniques are useful also as applied to formulations which need not be in terms of an integral. In particular, in portfolio structuring, this applies to a quantity known as value at risk (VAR) which may be defined as the worst potential loss of value of a portfolio over a period of time under normal market conditions, at a specified confidence level. While value at risk can be expressed as a definite limit in a one-sided indefinite integral (see Philippe Jorion, *Value at Risk*, Irwin Professional Publishing, 1997, p. 88), a more practical formulation is in terms of the inverse of a cumulative distribution function.

SUMMARY OF THE INVENTION

A preferred method for estimating the value of a financial security involves numerical integration unlike Monte Carlo integration in that an integrand is sampled at deterministic points having a low-discrepancy property. As compared with the Monte Carlo method, significant advantages are realized with respect to speed, accuracy, and dependability.

A computed estimate can be used in setting an offering price, e.g., somewhat higher that the estimate. An estimate can be used also in deciding whether to buy, hold or sell the security. For example, if the estimate exceeds the price at which the security is being offered for sale, a "buy" recommendation is appropriate.

A computed estimate can represent the value of other complex securities, e.g. a debt or insurance instrument.

Further to estimating the value of a complex security, sampling at points of a low-discrepancy deterministic sequence can be used in estimating value at risk in portfolio structuring.

Further included is an Appendix with two computer algorithms in "C" source language, respectively for computing Sobol points and Halton points. For a description of C, see B. W. Kernighan et al., *The Programming Language C*, Prentice-Hall, 1978.

DETAILED DESCRIPTION OF PREFERRED EMBODIMENTS

Figure 1:
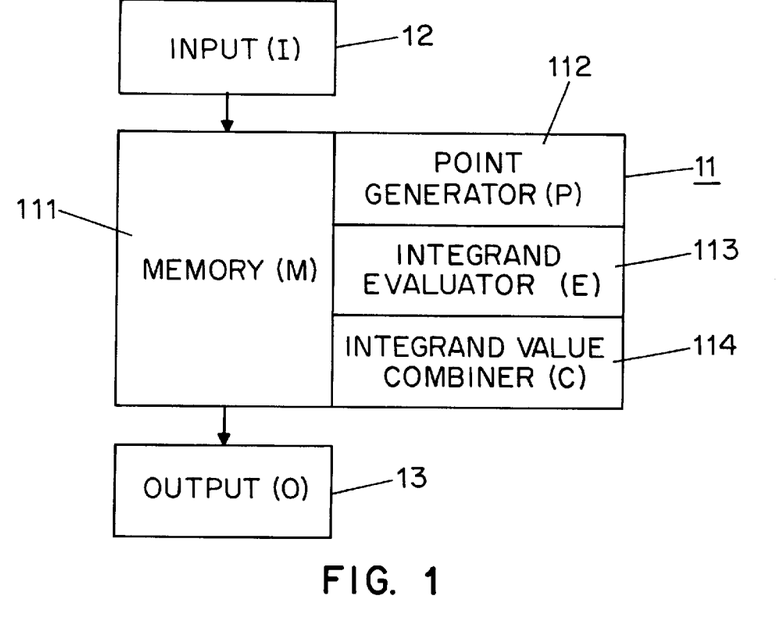
FIG. 1 is a schematic of a programmed computer system in accordance with a preferred embodiment of the invention.

FIG. 1 shows a stored-program computer 11 connected to input means 12, e.g., a keyboard, for entering financial securities data, and connected to output means 13, e.g., a visual display device, for displaying an estimated value of the financial security. The computer 11 includes a working memory 111 (M), a low-discrepancy deterministic point generator 112 (P), an integrand evaluator 113 (E), and an integrand-value combiner 114 (C).

In estimating the value of a multi-dimensional integral in financial securities valuation, a multivariate integrand is sampled at points corresponding to a low-discrepancy deterministic sequence of points in the multivariate unit cube as defined below. If the multivariate unit cube is also the domain of integration, the points of the low-discrepancy deterministic sequence can be used as sample points directly. In the case of a more general domain of integration, sample points correspond to points of a low-discrepancy deterministic sequence in the multivariate unit cube via a suitable transformation or mapping.

When a sufficiently large number of sampled values has been computed, an approximation of the integral is obtained by suitably combining the computed values, e.g., by averaging or weighted averaging.

In the d-dimensional unit cube $D=[0,1]^d$, a low-discrepancy deterministic sequence $z_1, z_2, \ldots$ of points in D can be characterized as follows:

For a point $t=[t_1, \ldots, t_d]$ in D, define $$[0, t) = [0, t_1) \times \ldots \times [0, t_d),$$

where $[0, t_i)$ denotes a left-closed, right-open interval, and denote with $X_{[0, t)}(.)$ the characteristic or indicator function of $[0, t)$. For points $z_1, \ldots, z_n$ in D, define $$R_n(t; z_1, \ldots, z_n) = (\Sigma_{k=1}^n X_{[0, t)}(z_k))/n - t_1 t_2 \ldots t_d,$$

and define the discrepancy of $z_1, \ldots, z_n$ as the $L_\infty$-norm of the function $R_n(.; z_1, \ldots, z_n)$, i.e., $$\|R_n(.; z_1, \ldots, z_n)\|_\infty = \sup_{t \in D} |R_n(t; z_1, \ldots, z_n)|.$$

The sequence $z_1, z_2, \ldots$ is said to be a low-discrepancy deterministic sequence provided $$\|R_n(.; z_1, \ldots, z_n)\|_\infty = O((\log n)^d/n).$$

Low-discrepancy deterministic sequences are described in the published literature; see, e.g., H. Niederreiter, "Random Number Generation and Quasi-Monte Carlo Methods", *CBMS-NSF*, 63, SIAM, Philadelphia, 1992 and S. Paskov, "Average Case Complexity of Multivariate Integration for Smooth Functions", *Journal of Complexity*, Vol. 9 (1993), pp. 291–312. Well-known examples of low-discrepancy deterministic sequences are the so-called Hammersley points, Halton points, Sobol points, and hyperbolic-cross points.

For illustration, in the case of Sobol points in a single dimension (d=1), a constructive definition may be given as follows: Choose a primitive polynomial $$P(x) = x^n + a_1 x^{n-1} + \ldots + a_{n-1} x + 1$$

(whose coefficients $a_i$ are either 0 or 1) and define so-called direction numbers $v_i$, $i > n$ by the following recurrence formula:

$$v_i = a_1 v_{i-1} \oplus a_2 v_{i-2} \oplus \ldots \oplus a_{n-1} v_{i-n+1} \oplus v_{i-n} \oplus (v_{i-n}/2^n),$$

where $\oplus$ denotes a bit-by-bit "exclusive or" operation.

The initial numbers $v_1 = m_1/2, \ldots, v_n = m_n/2^n$ can be chosen freely provided $m_i$ is odd and $0 < m_i < 2^i$ for $i=1, 2, \ldots, n$.

Using the direction numbers $v_i$ so defined, now define the one-dimensional Sobol sequence $x_1, x_2, \ldots$ by $$x_k = b_1 v_1 \oplus b_2 v_2 \oplus \ldots \oplus b_w v_w, \quad k \geq 0$$

where $k = \Sigma_{i=0}^{\lfloor \log k \rfloor} b_i 2^i$ is the binary representation of k.

For higher dimensions (d>1), the first d primitive polynomials $P_1, P_2, \ldots, P_d$ are used. If $\{x_k^i\}_{k=1}^\infty$ denotes the one-dimensional Sobol sequence generated by the polynomial $P_i$, the d-dimensional Sobol points are defined as $x_k = (x_k^1, x_k^2, \ldots, x_k^d)$.

While this definition can be implemented as a computer algorithm directly, faster techniques are known which produce these points in a "shuffled" or permuted sequence. In particular, this applies to the computer algorithm given in the Appendix.

For specificity in the following, a preferred embodiment of the invention is described as applied to a collateralized mortgage obligation known as CMO FN, 89-23. This has thirty-year maturity and consists of the following tranches:

PAC tranches 23-A, 23-B, 23-C, 23-D, 23-E
supporting tranches 23-G, 23-H, 23-J
residual tranche 23-R
accrual tranche 23-Z

The monthly cash flow is divided and distributed according to pre-specified rules which are included in a formal prospectus. Some of the basic rules may be stated as follows:

First from the monthly cash flow, the coupon is paid to the tranches. The remaining amount, called Principal Distribution Amount, is used for repayment of the principal. Prior to a fixed date in the future, the Principal Amount will be allocated sequentially to the tranches 23-G, 23-H, 23-J and 23-Z. After that date, the Principal Distribution Amount will be allocated sequentially to the tranches 23-A, 23-B, 23-C, 23-D and 23-E according to a planned schedule. Any excess amount of the Principal Distribution Amount over the planned schedule will be allocated sequentially to the tranches 23-G, 23-H, 23-J and 23-Z. A distribution of principal of the tranche 23-R will be made only after all other tranches have been retired.

In deriving an estimate for the present value of the security at the time of issue, the following notation is used below:

C—the monthly payment on the underlying mortgage pool;
$i_k$—the projected interest rate in month k, k=1, 2, ..., 360;
$w_k$—the percentage of mortgages prepaying in month k;
$a_{360-k+1}$—the remaining annuity after month k.

A remaining annuity $a_k$ can be expressed as $$a_k = 1 + v_0 + \ldots + v_0^{k-1}, \quad k=1,2,\ldots,360,$$

with $v_0 = 1/(1+i_0)$, where $i_0$ is the current monthly interest rate. Thus, after k months, the remaining amount of principal borrowed is $C.a_k$.

It is assumed that the interest rate $i_k$ can be expressed as $$i_k = K_0 \exp(\xi_k) i_{k-1},$$

where exp(.) denotes exponentiation and where $\xi_1, \xi_2, \ldots, \xi_{360}$ are independent, normally distributed random variables with mean 0 and variance $\sigma^2$, and $K_0$ is a given constant. For the present example, $\sigma^2 = 0.0004$ is chosen.

It is assumed further that $w_k$ as a function of $i_k$ can be computed as $$w_k = K_1 + K_2 \arctan(K_3 i_k + K_4),$$

where $K_1, K_2, K_3, K_4$ are given constants.

Under these assumptions, the cash flow in month k, k=1, 2, ..., 360 is $$C(1-w_1(\xi_1))\ldots(1-w_{k-1}(\xi_1,\ldots,\xi_{k-1}))(1-w_k(\xi_1,\ldots,\xi_k))$$
$$+w_k(\xi_1,\ldots,\xi_k)a_{360-k+1},$$

where $$w_k(\xi_1,\ldots,\xi_k)=K_1+K_2\arctan(K_3K_0{}^k i_0 \exp(\xi_1+\ldots+\xi_k)+K_4).$$

This cash flow is distributed according to the rules of FN, 89-23. Then, the cash flow for each of the tranches is multiplied by the discount factor $$v_1(\xi_1)\ldots v_k(\xi_1,\ldots,\xi_k), \text{ with}$$
$$v_j(\xi_1,\ldots,\xi_j)=1/(1+K_0 i_0 \exp(\xi_1+\ldots+\xi_j)), j=1, 2, \ldots, 360,$$

to find the present value for month k. Summing of the present values for every month gives the present value $PV_T$, for each tranche T.

The expected or estimated value, $$E(PV_T)=E(PV_T(\xi_1,\ldots,\xi_{360})),$$

upon a change of variables is represented by $$E(PV_T)=\int_D PV_T(y_1(x_1),\ldots,y_{360}(x_{360}))dx_1\ldots dx_{360},$$

where $$x_i=(2\pi\sigma)^{-\frac{1}{2}}\int_{-\infty}^{y_i}\exp(-t^2/(2\sigma))dt.$$

Thus, for each tranche T, a 360-variate integrand has to be integrated over the 360-dimensional unit cube.

After generating a point $$(x_1, x_2, \ldots, x_{360})$$

of a low-discrepancy deterministic sequence in the unit cube, the point $$(y_1, y_2, \ldots, y_{360})$$

is computed by finding the value of the inverse normal cumulative distribution function at each $x_k$. Then, for each tranche T, the function value $$PV_T(y_1, y_2, \ldots, y_{360})$$

is computed. These are the function values used in numerical integration.

Figure 2:
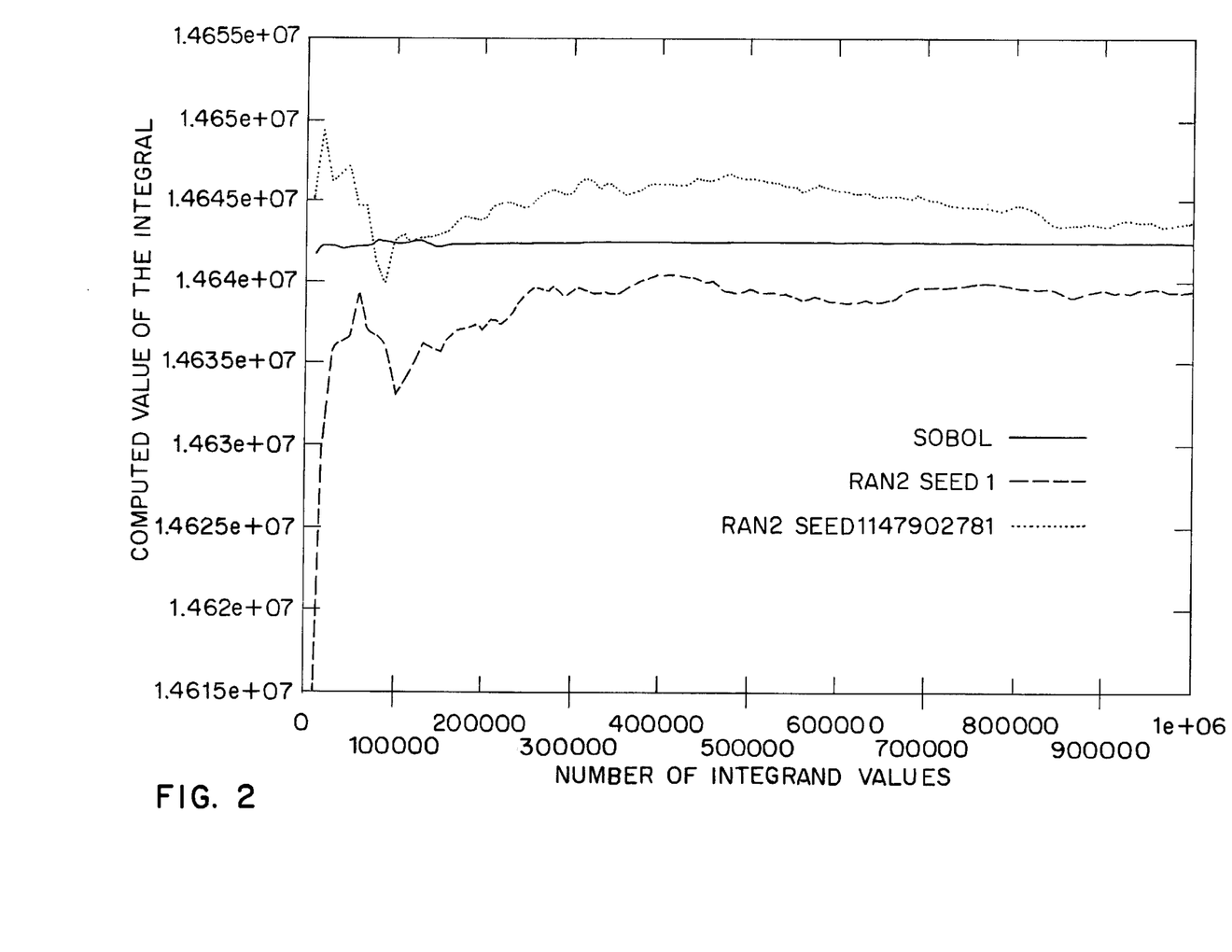
FIG. 2 is a graphic representation of performance data obtained in computer trial runs with an exemplary embodiment of the invention as compared with two Monte Carlo computations.
Figure 3:
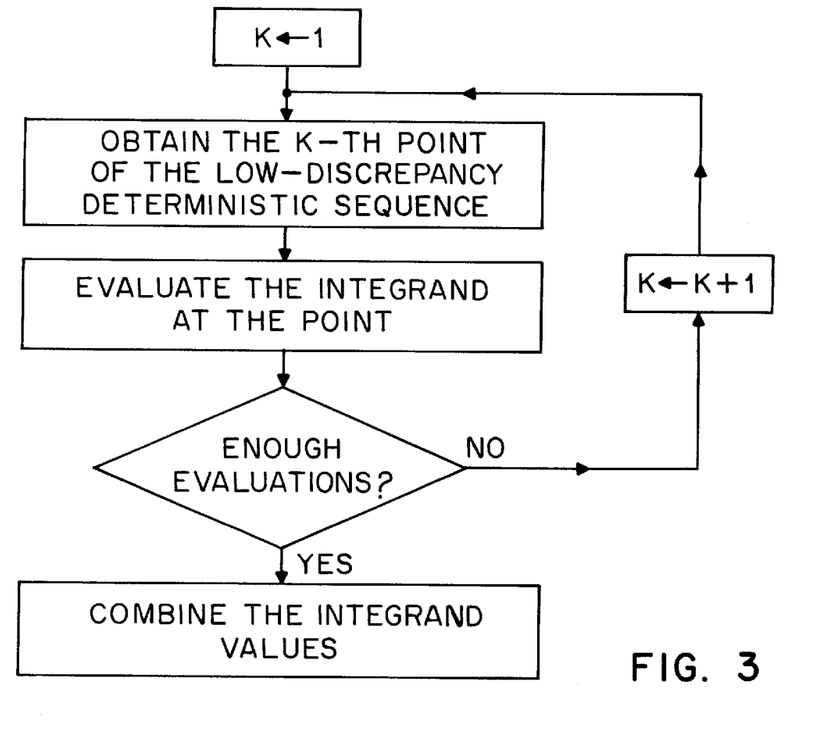
FIG. 3 is a flow diagram of a preferred embodiment of a method in accordance with the invention.

FIG. 2 shows results from trial runs for CMO FN, 89-23 with a preferred method using Sobol points generated by the corresponding computer algorithm given in the Appendix, as compared with Monte Carlo integration. Two Monte Carlo computations were carried out, with different "seeds" or starting values of a congruential pseudo-random number generator known as RAN2; see W. Press et al., *Numerical Recipes in C*, Cambridge University Press, 1992. It is apparent that the preferred method reaches a steady value more rapidly. In this and other trial runs, with typical requirements of precision and confidence, a speed-up by a factor of 3 to 5 was realized as compared with Monte Carlo integration. Much greater speed-up can be expected when higher precision or/and higher levels of confidence are sought.

In a further trial run with CMO FN, 89-23, instead of Sobol points, Halton points were used as generated by the corresponding computer algorithm given in the Appendix. It is felt that Sobol points may be preferred over Halton points for integrals of high dimension. However, this preference may not apply in the case of lower-dimensional integrals, e.g., with dimension up to 5 or so.

A computation as described may be terminated after a predetermined number of function evaluations. Alternatively, e.g., after every function evaluation or after a predetermined incremental number of function evaluations, a current approximation may be compared with one or several preceding approximations, for termination once a suitable condition depending on the difference between approximations is met. Such termination criteria may be called automatic. Automatic termination is particularly reliable where a sequence of approximations settles down smoothly; see, e.g., the curve in FIG. 2 corresponding to Sobol points.

Advantageously in computing function values, a cluster or network of multiple parallel processors or workstations can be used. This may involve a master or host processor providing points of a low-discrepancy sequence to slave processors and combining function values returned by the slave processors into an approximate value for the integral. Thus, the computation can be speeded up in proportion to the number of processors used.

Advantageous further, in combination with numerical integration as described above, is the use of error reduction techniques analogous to variance reduction in Monte Carlo integration as described, e.g., by M. Kalos et al., *Monte Carlo Methods*, John Wiley & Sons, 1986. This may involve a change of variables or/and variation reduction, for example.

The specific embodiment described above, involving valuation of a collateralized mortgage obligation, can be interpreted as follows: The definite integral represents the expected value of the sum of a series of payments on the obligation, namely the regular payments of mortgage principal and interest, plus any mortgage prepayments. The likelihood of prepayment depends in part on the prevailing level of interest for mortgage refunding.

For each payment, the value of the payment is weighted by the probability of all interest rate scenarios up to the time of the payment. Thus, for example, the amount of next month's payment will be valued based on the probability of all possible interest rates likely to prevail next month, and the impact of each of those possibilities on the likelihood of prepayment of principal. For the month after, valuation takes into account the interest rate scenarios of both months, their probabilities of occurrence, and the effect of interest rates on prepayment. In addition to next month's valuation, the month-after estimate will include an additional term corresponding to the month-after payment, represented by an integral over the possibilities of the two-month process. Further monthly payments, i.e. third, fourth et seq., are represented analogously. With each additional integral term representing a scheduled or unscheduled payment amount, the over-all value of the CMO is represented by the sum of the terms.

The value of the CMO can be decomposed further, e.g., by valuing the interest payment and the principal payment separately in each period to represent an "interest-only tranche" and a "principal-only tranche". Thus, the value of the CMO can be represented by the sum of a yet-greater number of integrals. Conveniently, the value of each of the individual integrals in the sum can be estimated as described above, using a low-discrepancy deterministic sequence of sample points.

A sum of payment integrals can also be used to represent the value of a portfolio of two or more CMOs, giving the same result as a single integral over the sum of the payments. The range of possibilities over which the integration is effected is the same in both cases.

A CMO portfolio can be augmented in other ways, e.g., by the inclusion of one or several bonds. For valuation purposes, a high-grade bond differs from a CMO in that prepayment will take place for the entire issue or not at all. Again, valuation depends on the fluctuation of interest rates, taking into account all possible future interest rate scenarios. This applies whether there is one payment (from a single CMO), several payments (from several CMOs), or payments from a combination of CMOs and bonds.

Other than CMOs and bonds, a complex security portfolio may include securities such as single-premium deferred annuities (SPDA). An SPDA is a contract sold by an insurance company to an annuitant investor. Under the contract, the insurance company takes money from the investor, invests this money in a portfolio of various investments, and credits a portion of the investment proceeds to the investor's account. The SPDA is an asset of the insurance company. There is an initial investment by the company in the cost of producing the contract. There is a predictable return for the company on the investment portfolio, of interest and principal payments by the various borrowers less the contractual crediting to the annuitant's account. The unpredictable factor in the valuation of the portfolio is again random movements of interest rates, as these influence prepayment of investment assets as well as unexpected withdrawals and cash demands by the annuitant. The same methodology of valuation can be used after inclusion of the SPDA asset in the complex security.

Valuation, by the insurance company, of a portfolio including an SPDA contract involves estimating the value of the contract itself. In pricing a new contract, its value is estimated in advance of issue by making assumptions about the kinds of assets that will be in the portfolio along with the SPDA. The pricing of the SPDA before issue and its valuation after issue are equivalent to the calculation presented above for a CMO.

A life insurance policy, or any other kind of insurance contract differs from the above in that, in addition to the interest rate variable, there is an additional stochastic variable representing health risk, mortality risk or fire risk, for example. Under inclusion of this variable, the same techniques as described above can be used for valuation.

Many other types of securities are amenable to corresponding valuation and estimation, where each period's prospective payment is valued depending upon all previous values of a stochastic variable. For example, in the case of an interest rate option, the stochastic variable is interest rate and the payment is the value of a bond. In the case of a stock option, the variable is the price of the stock. In the case of a currency option, the variable is the relative value of two currencies.

As an example of an application of sampling of a function other than an integrand, the following concerns value at risk (VAR). If $$h=h(\xi_1, \ldots, \xi_d)$$

denotes the potential loss of a portfolio whose value depends on d market factors represented by stochastic variables $\xi_1, \ldots, \xi_d$, and if $F_n$ denotes the cumulative distribution function of h, i.e.

$$F_h(x)=\text{Prob }\{h<x\},$$

then, for a specified percentile or quantile p, $$VAR=x_p=F_h^{-1}(p).$$

The value of p represents a level of confidence, with p=1 representing certainty. For practical purposes, a choice of p=0.98 is typical, indicating that the loss may exceed VAR with a probability of 2%.

Figure 7:
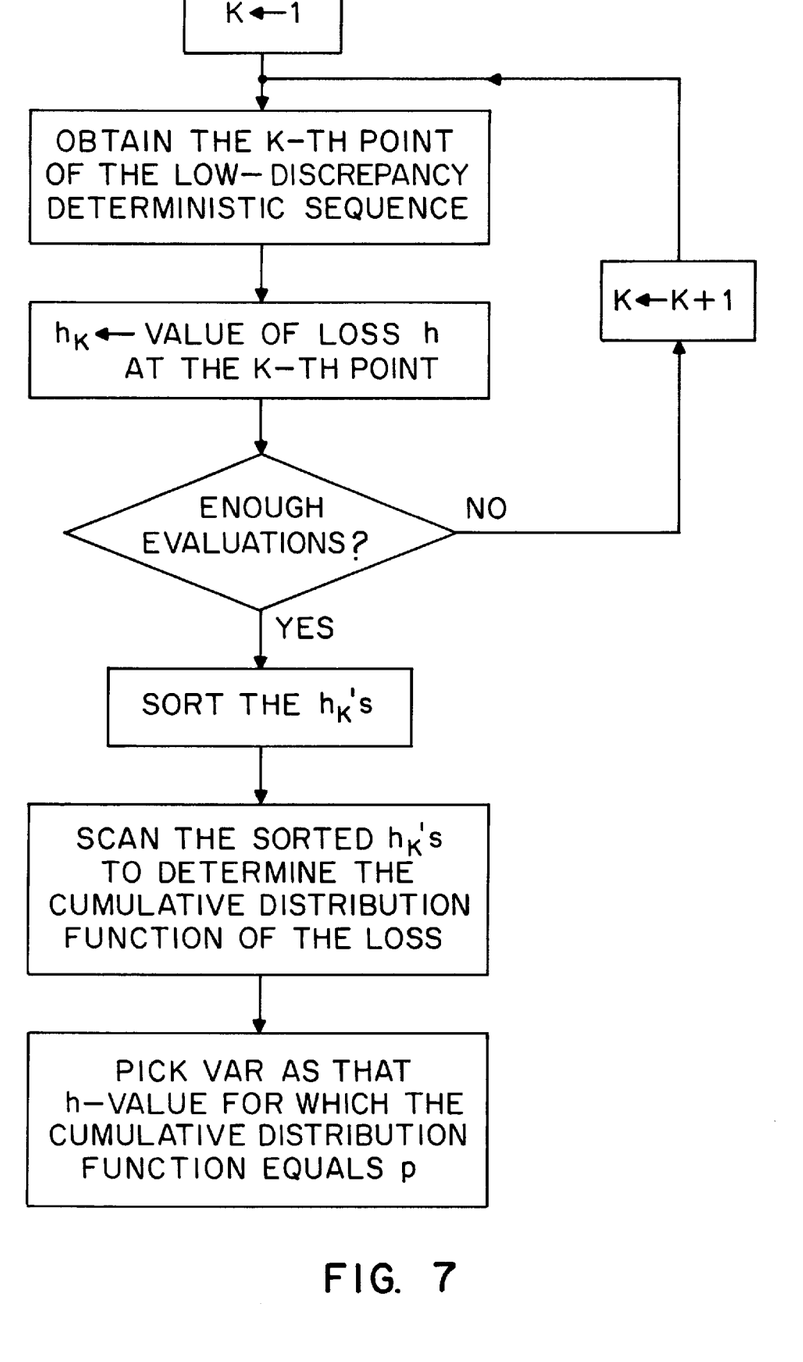
FIG. 7 is a flow diagram of determining value at risk (VAR) for portfolio structuring in accordance with a preferred embodiment of the invention.

In accordance with a preferred embodiment of the invention, VAR can be estimated by a technique as illustrated by FIG. 7, using sampling of the potential loss function at m points of a low-discrepancy deterministic sequence. The potential loss $h_k$ is evaluated for each point of the sequence, resulting in a list $h_1, \ldots, h_m$. The number of points, can be pre-set, e.g. at m=1000. The list is sorted, and the cumulative distribution function is determined. The cumulative distribution function is a monotonically increasing function whose domain $\{x\}$ includes the h-values and whose range $\{F_h(x)\}$ is in the interval from 0 to 1. The desired estimate of VAR is determined as that value of x for which $F_h(x)=p$. (It is understood that, wherever exact equality cannot be realized in calculation, a value will be approximated or interpolated.)

An implementation of the technique was applied to a 34-dimensional problem, namely a portfolio of 34 at-the-money currency and equity options having maturity of one year, with $10,000 allocated to each of the options, yielding a total portfolio of $340,000. Volatility and correlation data were taken from J. P. Morgan/Reuters RiskMetrics data sets.

The technique was applied further to a 360-dimensional problem, namely the CMO portfolio consisting of ten tranches as described above, with $100,000 allocated to each tranche, yielding a total portfolio or $1,000,000.

For the options portfolio, 1,000 points of the low-discrepancy deterministic generalized Faure sequence resulted in VAR being determined to within 1% of a reference determination using 100,000 points. For the CMO portfolio, a determination of VAR using 1,500 points of the same sequence also was within 1% of a reference value, obtained from 150,000 points. These results are contrasted with prior-art Monte-Carlo computations where, for the same numbers of samples (1,000 and 1,500, respectively), VAR could be estimated only to within 10% of the respective reference values, i.e. with 10-fold error as compared with the low-discrepancy deterministic sequence determinations.

Figure 4:
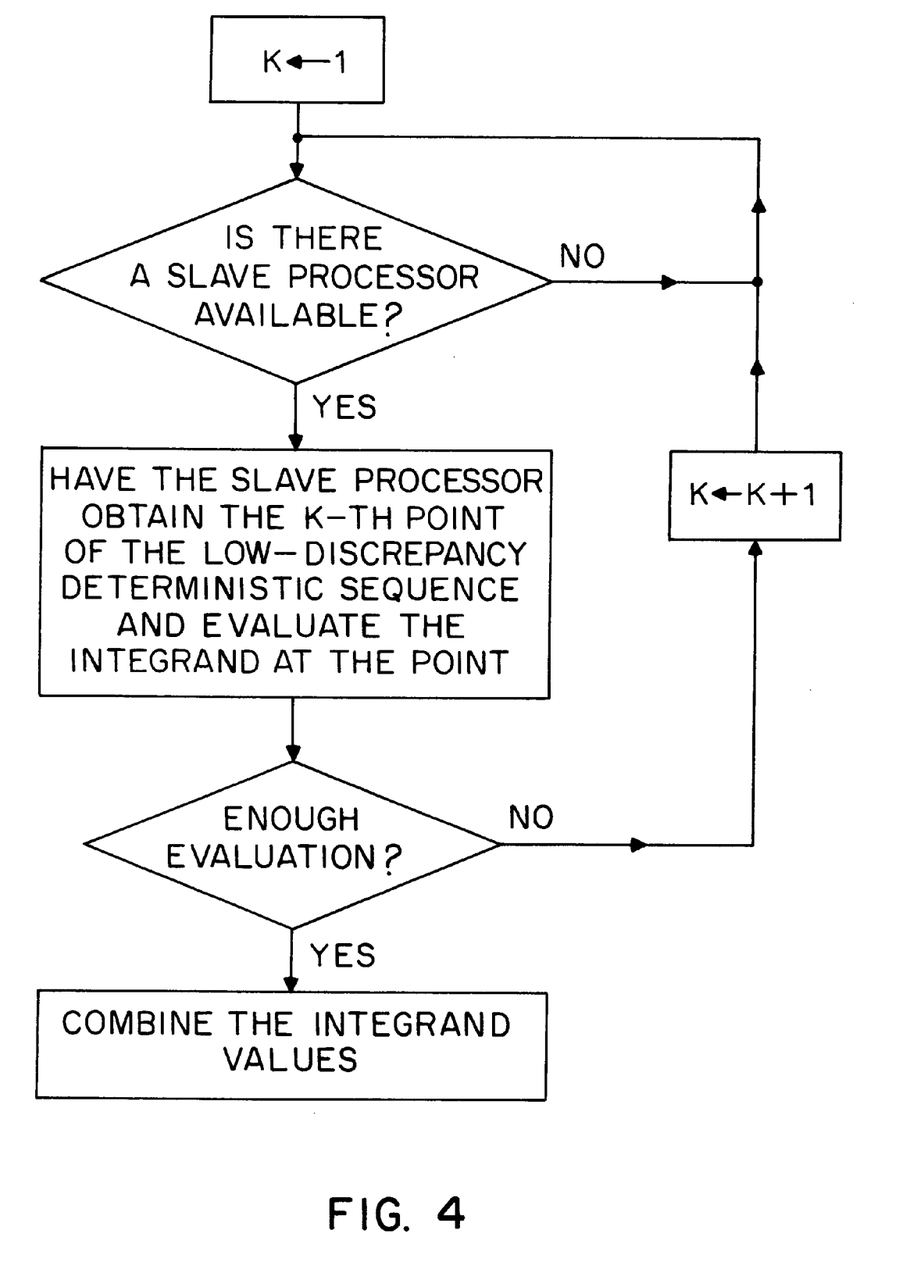
FIG. 4 is a flow diagram of a preferred further embodiment of the invention, including the use of multiple processors.
Figure 5:
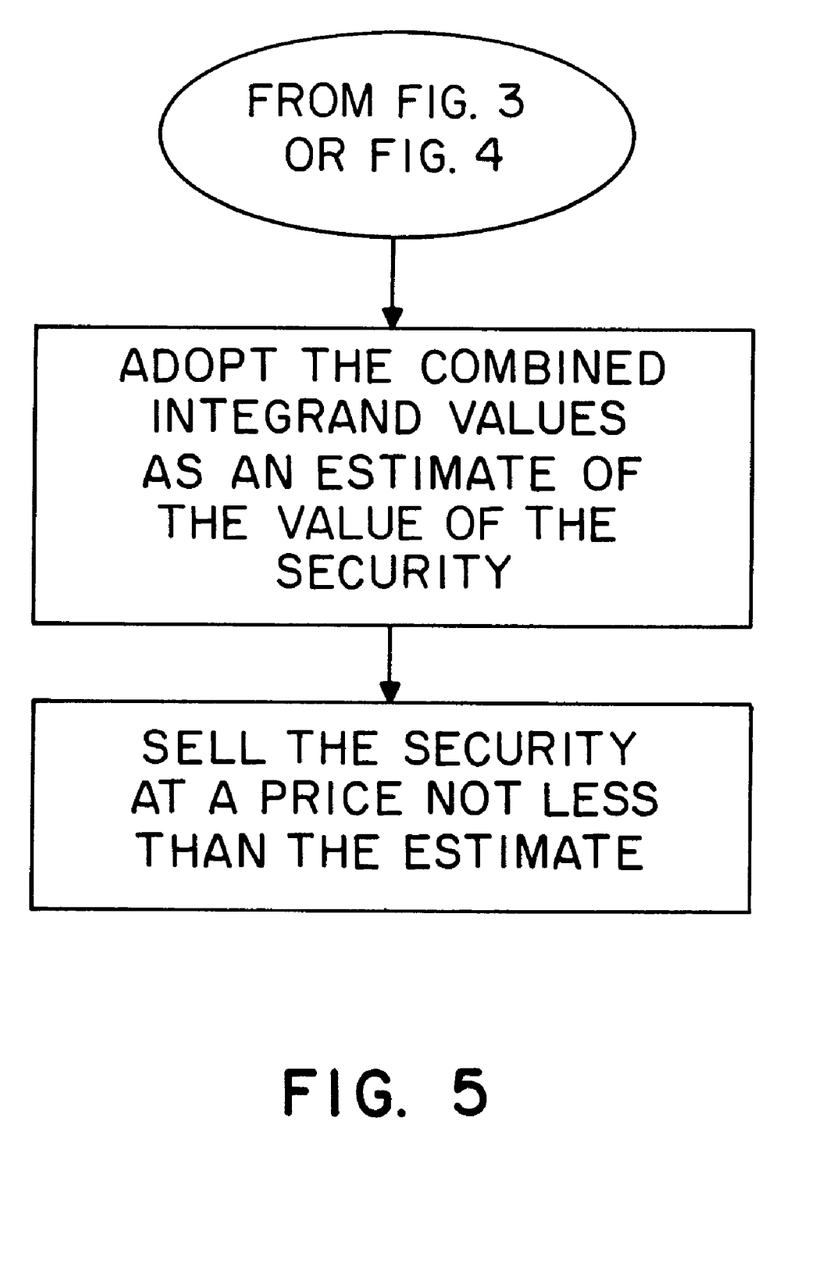
FIG. 5 is a flow diagram of initially selling a complex security in accordance with a preferred embodiment of the invention.
Figure 6:
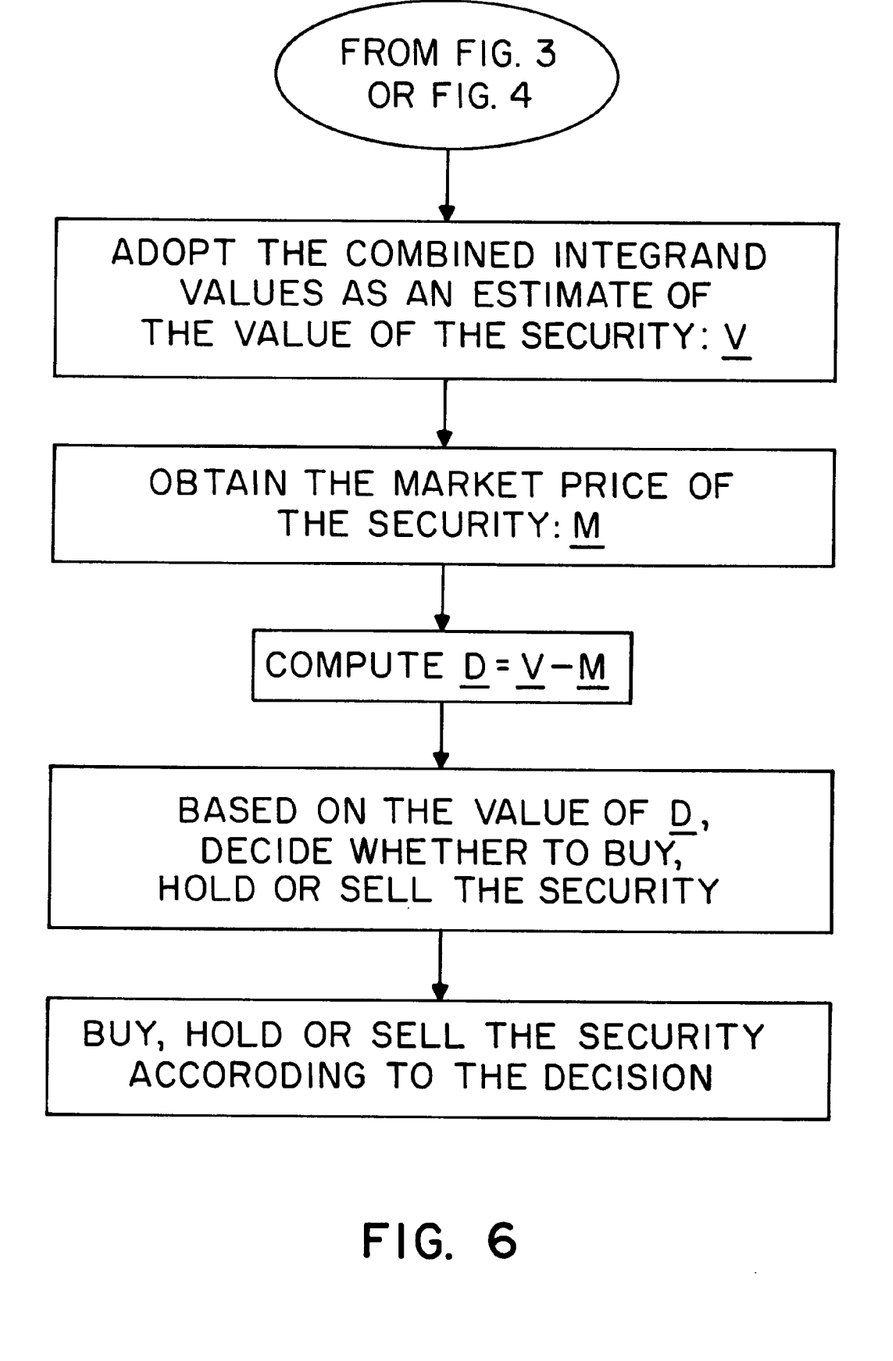
FIG. 6 is a flow diagram of buying/holding/selling a complex security in accordance with a preferred further embodiment of the invention.

In the technique as described, computational effort is greatest in evaluating the $h_k$'s, and the computation can be accelerated significantly by using multiple processors for evaluation in a fashion analogous to FIG. 4. In this fashion, e.g. if 10 processors are available, a 10-fold increase can be achieved in the computational speed in sampling of the loss as compared with a single processor.

Figure 8:
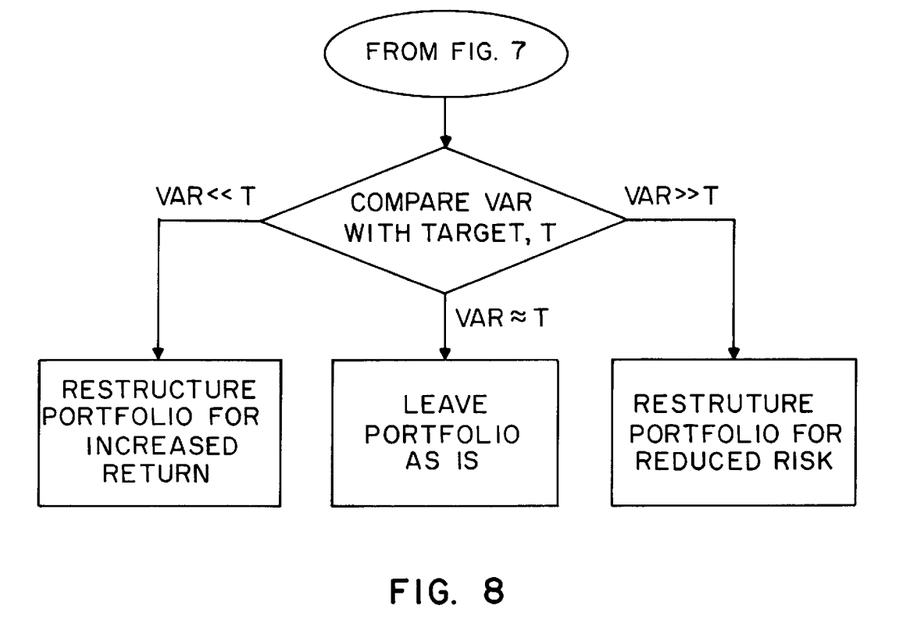
FIG. 8 is a flow diagram of an example of portfolio structuring in accordance with a preferred embodiment of the invention.

As illustrated by FIG. 8, a computed value of VAR can be compared with a target value which is considered acceptable. If VAR meets the target level, the portfolio may remain unchanged; if VAR is considerably less than the target level, the portfolio may be restructured for assumption of greater risk and potentially increased return; if VAR exceeds the target level, restructuring for reduced risk is indicated. Restructuring may be performed immediately or over time, e.g. by changing investment policies affecting future transactions.

APPENDIX

```
/************************************************************
    void sobol(int n)
        This is the function sobol for generating Sobol points. It returns the
        n-th d-dimensional Sobol point. (The point (0,0, . . . , 0) is skipped.)
        The point is implicitly returned through the array x. The function
        sobseq from Numerical Recipes, 1992 was used as a basis, but
        changed significantly to accommodate the parallel distributed approach.
        The function sobol can generate Sobol points skipping an initial
        part of the sequence. The constant MAXDIM, see Numerical Recipes,
        is extended to 360 which required adding more initializing data to
        the arrays ip (the primitive polynomials),
        mdeg (their degrees), and iv (the initial direction numbers). The
        polynomial x is used to generate the first coordinate of Sobol points.
    ************************************************************/
#include "nrutil.h"
#define MAXBIT 360
#define MAXDIM 360
extern int d;     /* actual dimension of the points */
extern double *x;    /* This returns implicitly the n-th Sobol point in x */
void sobol(int n)
{
    int j,k,l;
    unsigned long i,im,ipp;
    static double fac;
    static unsigned long in,ix[MAXDIM+1],*iu[MAXBIT+1];
    static unsigned long mdeg[MAXDIM+1]={0,MAXBIT,1,2,3,3,4,4,
                    5,5,5,5,5,5,
                    6,6,6,6,6,6,
                    7,7,7,7,7,7,7,7,7,7,7,7,7,7,7,7,
/*16*/              8,8,8,8,8,8,8,8,8,8,8,8,8,8,8,8,
                    9,9,9,9,9,9,9,9,9,9,9,9,9,9,9,9,
                    9,9,9,9,9,9,9,9,9,9,9,9,9,9,9,9,
                    9,9,9,9,9,9,9,9,9,9,9,9,9,9,9,9,
/*20*/        10,10,10,10,10,10,10,10,10,10,10,10,10,10,10,10,10,10,10,10,
              10,10,10,10,10,10,10,10,10,10,10,10,10,10,10,10,10,10,10,10,
              10,10,10,10,10,10,10,10,10,10,10,10,10,10,10,10,10,10,10,10,
              11,11,11,11,11,11,11,11,11,11,11,11,11,11,11,11,11,11,11,11,
              11,11,11,11,11,11,11,11,11,11,11,11,11,11,11,11,11,11,11,11,
              11,11,11,11,11,11,11,11,11,11,11,11,11,11,11,11,11,11,11,11,
              11,11,11,11,11,11,11,11,11,11,11,11,11,11,11,11,11,11,11,11,
              11,11,11,11,11,11,11,11,11,11,11,11,11,11,11,11,11,11,11,11,
              11,11,11,11,11,11,11,11,11,11,11,11,11,11,11,11,11,11,11,11,
              11,11,11,11,11,11,11,11,11,11,11,11,11,11,11,11,11,11,11,11,
              11,11,11,11,11,11,11,11,11,11,11,11,11,11,11,11,11,11,11,11,
              11,11,11,11,11,11,11,11,11,11,11,11,11,11,11,
              12,12,12,12,12,12,12,12,12,12,12,12,12,12,12,12,12,12,12,
              12,12,12
              };
    /* The first coordinate is set to MAXBIT, but it is never used */
    static unsigned long [MAXDIM+1]={0,MAXBIT,0,1,1,2,1,4,
/*deg 5*/                                     2,13,7,14,11,4,
/*deg 6*/                                     1,16,13,22,19,25,
/*deg 7*/                 1,32,4,8,7,56,14,28,19,50,21,42,31,62,37,41,55,59,
/*deg 8*/          14,56,21,22,38,47,49,50,52,67,70,84,97,103,115,122,
/*deg 9*/        8,13,16,22,25,44,47,52,55,59,62,67,74,81,82,87,91,94,
            103,104,109,122,124,137,138,143,145,152,157,167,173,176,181,182,185,
            191,194,199,218,220,227,229,230,234,236,241,244,253,
/*deg 10*/      4,13,19,22,50,55,64,69,98,107,115,121,127,134,140,145,152,
            158,161,171,181,194,199,203,208,227,242,251,253,265,266,274,283,289,295,
            301,316,319,324,346,352,361,367,382,395,398,400,412,419,422,426,428,433,
            446,454,457,472,493,505,508,
/*deg 11*/     2,11,21,22,35,49,50,56,61,70,74,79,84,88,103,104,112,115,117,122,134,
            137,146,148,157,158,162,164,168,173,185,186,191,193,199,213,214,220,227,
            236,242,251,256,259,265,266,276,292,304,310,316,319,322,328,334,339,341,
            345,346,362,367,372,375,376,381,385,388,392,409,415,416,421,428,431,434,
            439,446,451,453,457,458,471,475,478,484,493,494,499,502,517,518,524,527,
            555,560,565,569,578,580,587,589,590,601,607,611,614,617,618,625,628,635,
            641,647,654,659,662,672,675,682,684,689,695,696,713,719,724,733,734,740,
            747,749,752,755,762,770,782,784,787,789,793,796,803,805,810,815,824,829,
            830,832,841,847,849,861,871,878,889,892,901,908,920,923,942,949,950,954,
            961,968,971,973,979,982,986,998,1001,1010,1012,
/*deg 12*/    41,52,61,62,76,104,117,131,143,145,157,167,171,176,181,194,217,236,
            239,262,283,286,307};
    static unsigned long iv[MAXDIM*MAXBIT+1]={
        0,   /* 40 elements in a row */
1,1,1,1,1,1,1,1,1,1,1,1,1,1,1,1,1,1,1,1,1,1,1,1,1,1,1,1,1,1,1,1,1,1,1,1,1,1,1,1,
1,1,1,1,1,1,1,1,1,1,1,1,1,1,1,1,1,1,1,1,1,1,1,1,1,1,1,1,1,1,1,1,1,1,1,1,1,1,1,1,
1,1,1,1,1,1,1,1,1,1,1,1,1,1,1,1,1,1,1,1,1,1,1,1,1,1,1,1,1,1,1,1,1,1,1,1,1,1,1,1,
1,1,1,1,1,1,1,1,1,1,1,1,1,1,1,1,1,1,1,1,1,1,1,1,1,1,1,1,1,1,1,1,1,1,1,1,1,1,1,1,
```

APPENDIX-continued

```
1,1,1,1,1,1,1,1,1,1,1,1,1,1,1,1,1,1,1,1,1,1,1,1,1,1,1,1,1,1,1,1,
1,1,1,1,1,1,1,1,1,1,1,1,1,1,1,1,1,1,1,1,1,1,1,1,1,1,1,1,1,1,1,1,
1,1,1,1,1,1,1,1,1,1,1,1,1,1,1,1,1,1,1,1,1,1,1,1,1,1,1,1,1,1,1,1,
1,1,1,1,1,1,1,1,1,1,1,1,1,1,1,1,1,1,1,1,1,1,1,1,1,1,1,1,1,1,1,1,
1,1,1,1,1,1,1,1,1,1,1,1,1,1,1,1,1,1,1,1,1,1,1,1,1,1,1,1,1,1,1,1,  /*end 1 */
1,3,1,3,1,3,1,3,3,1,3,1,3,1,3,1,1,3,1,3,1,3,1,3,3,1,3,1,3,1,3,1,3,1,1,3,1,3,1,3,1,3,
1,3,1,3,1,3,1,3,3,1,3,1,3,1,3,1,1,3,1,3,1,3,1,3,3,1,3,1,3,1,3,1,1,3,1,3,1,3,1,3,1,3,
1,3,1,3,1,3,1,3,3,1,3,1,3,1,3,1,1,3,1,3,1,3,1,3,3,1,3,1,3,1,3,1,1,3,1,3,1,3,1,3,1,3,
1,3,1,3,1,3,1,3,3,1,3,1,3,1,3,1,1,3,1,3,1,3,1,3,3,1,3,1,3,1,3,1,1,3,1,3,1,3,1,3,1,3,
1,3,1,3,1,3,1,3,3,1,3,1,3,1,3,1,1,3,1,3,1,3,1,3,3,1,3,1,3,1,3,1,1,3,1,3,1,3,1,3,1,3,
1,3,1,3,1,3,1,3,3,1,3,1,3,1,3,1,1,3,1,3,1,3,1,3,3,1,3,1,3,1,3,1,1,3,1,3,1,3,1,3,1,3,
1,3,1,3,1,3,1,3,3,1,3,1,3,1,3,1,1,3,1,3,1,3,1,3,3,1,3,1,3,1,3,1,1,3,1,3,1,3,1,3,1,3,
1,3,1,3,1,3,1,3,3,1,3,1,3,1,3,1,1,3,1,3,1,3,1,3,3,1,3,1,3,1,3,1,1,3,1,3,1,3,1,3,1,3,
1,3,1,3,1,3,1,3,3,1,3,1,3,1,3,1,1,3,1,3,1,3,1,3,3,1,3,1,3,1,3,1,1,3,1,3,1,3,1,3,1,3,  /*end 2 */
1,5,7,7,5,1,3,3,7,5,5,7,7,1,3,3,7,5,1,1,5,3,3,1,7,5,1,3,3,7,5,1,1,5,7,7,5,1,3,3,
1,5,7,7,5,1,3,3,7,5,5,7,7,1,3,3,7,5,1,1,5,3,3,1,7,5,1,3,3,7,5,1,1,5,7,7,5,1,3,3,
1,5,7,7,5,1,3,3,7,5,5,7,7,1,3,3,7,5,1,1,5,3,3,1,7,5,1,3,3,7,5,1,1,5,7,7,5,1,3,3,
1,5,7,7,5,1,3,3,7,5,5,7,7,1,3,3,7,5,1,1,5,3,3,1,7,5,1,3,3,7,5,1,1,5,7,7,5,1,3,3,
1,5,7,7,5,1,3,3,7,5,5,7,7,1,3,3,7,5,1,1,5,3,3,1,7,5,1,3,3,7,5,1,1,5,7,7,5,1,3,3,
1,5,7,7,5,1,3,3,7,5,5,7,7,1,3,3,7,5,1,1,5,3,3,1,7,5,1,3,3,7,5,1,1,5,7,7,5,1,3,3,
1,5,7,7,5,1,3,3,7,5,5,7,7,1,3,3,7,5,1,1,5,3,3,1,7,5,1,3,3,7,5,1,1,5,7,7,5,1,3,3,
1,5,7,7,5,1,3,3,7,5,5,7,7,1,3,3,7,5,1,1,5,3,3,1,7,5,1,3,3,7,5,1,1,5,7,7,5,1,3,3,
1,5,7,7,5,1,3,3,7,5,5,7,7,1,3,3,7,5,1,1,5,3,3,1,7,5,1,3,3,7,5,1,1,5,7,7,5,1,3,3,  /*end 3 */
1,15,11,5,3,1,7,9,13,11,1,3,7,9,5,13,13,11,3,15,5,3,15,7,9,13,9,1,11,7,5,15,1,15,11,5,3,1,7,9,
1,15,11,5,3,1,7,9,13,11,1,3,7,9,5,13,13,11,3,15,5,3,15,7,9,13,9,1,11,7,5,15,1,15,11,5,3,1,7,9,
1,15,11,5,3,1,7,9,13,11,1,3,7,9,5,13,13,11,3,15,5,3,15,7,9,13,9,1,11,7,5,15,1,15,11,5,3,1,7,9,
1,15,11,5,3,1,7,9,13,11,1,3,7,9,5,13,13,11,3,15,5,3,15,7,9,13,9,1,11,7,5,15,1,15,11,5,3,1,7,9,
1,15,11,5,3,1,7,9,13,11,1,3,7,9,5,13,13,11,3,15,5,3,15,7,9,13,9,1,11,7,5,15,1,15,11,5,3,1,7,9,
1,15,11,5,3,1,7,9,13,11,1,3,7,9,5,13,13,11,3,15,5,3,15,7,9,13,9,1,11,7,5,15,1,15,11,5,3,1,7,9,
1,15,11,5,3,1,7,9,13,11,1,3,7,9,5,13,13,11,3,15,5,3,15,7,9,13,9,1,11,7,5,15,1,15,11,5,3,1,7,9,
1,15,11,5,3,1,7,9,13,11,1,3,7,9,5,13,13,11,3,15,5,3,15,7,9,13,9,1,11,7,5,15,1,15,11,5,3,1,7,9,
1,15,11,5,3,1,7,9,13,11,1,3,7,9,5,13,13,11,3,15,5,3,15,7,9,13,9,1,11,7,5,15,1,15,11,5,3,1,7,9,
/*end 4 */
1,17,13,7,15,9,31,9,3,27,15,29,21,23,19,11,25,7,13,17,1,25,29,3,31,11,5,23,27,19,21,5,1,17,3,
7,15,9,31,9,
1,17,13,7,15,9,31,9,3,27,15,29,21,23,19,11,25,7,13,17,1,25,29,3,31,11,5,23,27,19,21,5,1,17,3,
7,15,9,31,9,
1,17,13,7,15,9,31,9,3,27,15,29,21,23,19,11,25,7,13,17,1,25,29,3,31,11,5,23,27,19,21,5,1,17,3,
7,15,9,31,9,
1,17,13,7,15,9,31,9,3,27,15,29,21,23,19,11,25,7,13,17,1,25,29,3,31,11,5,23,27,19,21,5,1,17,3,
7,15,9,31,9,
1,17,13,7,15,9,31,9,3,27,15,29,21,23,19,11,25,7,13,17,1,25,29,3,31,11,5,23,27,19,21,5,1,17,3,
7,15,9,31,9,
1,17,13,7,15,9,31,9,3,27,15,29,21,23,19,11,25,7,13,17,1,25,29,3,31,11,5,23,27,19,21,5,1,17,3,
7,15,9,31,9,
1,17,13,7,15,9,31,9,3,27,15,29,21,23,19,11,25,7,13,17,1,25,29,3,31,11,5,23,27,19,21,5,1,17,3,
7,15,9,31,9,
1,17,13,7,15,9,31,9,3,27,15,29,21,23,19,11,25,7,13,17,1,25,29,3,31,11,5,23,27,19,21,5,1,17,3,
7,15,9,31,9,
1,17,13,7,15,9,31,9,3,27,15,29,21,23,19,11,25,7,13,17,1,25,29,3,31,11,5,23,27,19,21,5,1,17,3,
7,15,9,31,9,   /*end 5 */
1,51,61,43,51,59,47,57,35,53,19,51,61,37,33,7,5,11,39,63,27,17,15,23,29,3,21,13,31,25,9,49,33,
19,29,11,19,27,15,25,
1,51,61,43,51,59,47,57,35,53,19,51,61,37,33,7,5,11,39,63,27,17,15,23,29,3,21,13,31,25,9,49,33,
19,29,11,19,27,15,25,
1,51,61,43,51,59,47,57,35,53,19,51,61,37,33,7,5,11,39,63,27,17,15,23,29,3,21,13,31,25,9,49,33,
19,29,11,19,27,15,25,
1,51,61,43,51,59,47,57,35,53,19,51,61,37,33,7,5,11,39,63,27,17,15,23,29,3,21,13,31,25,9,49,33,
19,29,11,19,27,15,25,
1,51,61,43,51,59,47,57,35,53,19,51,61,37,33,7,5,11,39,63,27,17,15,23,29,3,21,13,31,25,9,49,33,
19,29,11,19,27,15,25,
1,51,61,43,51,59,47,57,35,53,19,51,61,37,33,7,5,11,39,63,27,17,15,23,29,3,21,13,31,25,9,49,33,
19,29,11,19,27,15,25,
1,51,61,43,51,59,47,57,35,53,19,51,61,37,33,7,5,11,39,63,27,17,15,23,29,3,21,13,31,25,9,49,33,
19,29,11,19,27,15,25,
1,51,61,43,51,59,47,57,35,53,19,51,61,37,33,7,5,11,39,63,27,17,15,23,29,3,21,13,31,25,9,49,33,
19,29,11,19,27,15,25,
1,51,61,43,51,59,47,57,35,53,19,51,61,37,33,7,5,11,39,63,27,17,15,23,29,3,21,13,31,25,9,49,33,
19,29,11,19,27,15,25,   /*end 6 */
1,85,67,49,125,25,109,43,89,69,113,47,55,97,3,37,83,103,27,13,33,115,41,79,17,29,119,75,73,105,
7,59,65,21,3,113,61,89,45,107,
1,85,67,49,125,25,109,43,89,69,113,47,55,97,3,37,83,103,27,13,33,115,41,79,17,29,119,75,73,105,
7,59,65,21,3,113,61,89,45,107,
1,85,67,49,125,25,109,43,89,69,113,47,55,97,3,37,83,103,27,13,33,115,41,79,17,29,119,75,73,105,
7,59,65,21,3,113,61,89,45,107,
1,85,67,49,125,25,109,43,89,69,113,47,55,97,3,37,83,103,27,13,33,115,41,79,17,29,119,75,73,105,
7,59,65,21,3,113,61,89,45,107,
1,85,67,49,125,25,109,43,89,69,113,47,55,97,3,37,83,103,27,13,33,115,41,79,17,29,119,75,73,105,
7,59,65,21,3,113,61,89,45,107,
```

APPENDIX-continued 1,85,67,49,125,25,109,43,89,69,113,47,55,97,3,37,83,103,27,13,33,115,41,79,17,29,119,75,73,105,
7,59,65,21,3,113,61,89,45,107,
1,85,67,49,125,25,109,43,89,69,113,47,55,97,3,37,83,103,27,13,33,115,41,79,17,29,119,75,73,105,
7,59,65,21,3,113,61,89,45,107,
1,85,67,49,125,25,109,43,89,69,113,47,55,97,3,37,83,103,27,13,33,115,41,79,17,29,119,75,73,105,
7,59,65,21,3,113,61,89,45,107,
1,85,67,49,125,25,109,43,89,69,113,47,55,97,3,37,83,103,27,13,33,115,41,79,17,29,119,75,73,105,
7,59,65,21,3,113,61,89,45,107,   /*end 7 */
1,255,79,147,141,89,173,43,9,25,115,97,19,97,197,101,255,29,203,65,195,177,105,17,47,169,109,
149,15,213,135,253,191,155,175,63,47,7,23,39,
1,255,79,147,141,89,173,43,9,25,115,97,19,97,197,101,255,29,203,65,195,177,105,17,47,169,109,
149,15,213,135,253,191,155,175,63,47,7,23,39,
1,255,79,147,141,89,173,43,9,25,115,97,19,97,197,101,255,29,203,65,195,177,105,17,47,169,109,
149,15,213,135,253,191,155,175,63,47,7,23,39,
1,255,79,147,141,89,173,43,9,25,115,97,19,97,197,101,255,29,203,65,195,177,105,17,47,169,109,
149,15,213,135,253,191,155,175,63,47,7,23,39,
1,255,79,147,141,89,173,43,9,25,115,97,19,97,197,101,255,29,203,65,195,177,105,17,47,169,109,
149,15,213,135,253,191,155,175,63,47,7,23,39,
1,255,79,147,141,89,173,43,9,25,115,97,19,97,197,101,255,29,203,65,195,177,105,17,47,169,109,
149,15,213,135,253,191,155,175,63,47,7,23,39,
1,255,79,147,141,89,173,43,9,25,115,97,19,97,197,101,255,29,203,65,195,177,105,17,47,169,109,
149,15,213,135,253,191,155,175,63,47,7,23,39,
1,255,79,147,141,89,173,43,9,25,115,97,19,97,197,101,255,29,203,65,195,177,105,17,47,169,109,
149,15,213,135,253,191,155,175,63,47,7,23,39,
1,255,79,147,141,89,173,43,9,25,115,97,19,97,197,101,255,29,203,65,195,177,105,17,47,169,109,
149,15,213,135,253,191,155,175,63,47,7,23,39,   /*end 8 */
1,257,465,439,177,321,181,225,235,103,411,233,59,353,329,463,385,111,475,451,263,19,249,275,
369,393,167,333,473,469,101,21,451,229,247,297,403,497,61,361,
1,257,465,439,177,321,181,225,235,103,411,233,59,353,329,463,385,111,475,451,263,19,249,275,
369,393,167,333,473,469,101,21,451,229,247,297,403,497,61,361,
1,257,465,439,177,321,181,225,235,103,411,233,59,353,329,463,385,111,475,451,263,19,249,275,
369,393,167,333,473,469,101,21,451,229,247,297,403,497,61,361,
1,257,465,439,177,321,181,225,235,103,411,233,59,353,329,463,385,111,475,451,263,19,249,275,
369,393,167,333,473,469,101,21,451,229,247,297,403,497,61,361,
1,257,465,439,177,321,181,225,235,103,411,233,59,353,329,463,385,111,475,451,263,19,249,275,
369,393,167,333,473,469,101,21,451,229,247,297,403,497,61,361,
1,257,465,439,177,321,181,225,235,103,411,233,59,353,329,463,385,111,475,451,263,19,249,275,
369,393,167,333,473,469,101,21,451,229,247,297,403,497,61,361,
1,257,465,439,177,321,181,225,235,103,411,233,59,353,329,463,385,111,475,451,263,19,249,275,
369,393,167,333,473,469,101,21,451,229,247,297,403,497,61,361,
1,257,465,439,177,321,181,225,235,103,411,233,59,353,329,463,385,111,475,451,263,19,249,275,
369,393,167,333,473,469,101,21,451,229,247,297,403,497,61,361,
1,257,465,439,177,321,181,225,235,103,411,233,59,353,329,463,385,111,475,451,263,19,249,275,
369,393,167,333,473,469,101,21,451,229,247,297,403,497,61,361,
/*end 9 */
1,771,721,1013,759,835,949,113,929,615,157,39,761,169,983,657,647,581,505,833,139,147,203,81,
337,829,989,375,365,131,215,733,451,447,177,57,471,979,197,251,
1,771,721,1013,759,835,949,113,929,615,157,39,761,169,983,657,647,581,505,833,139,147,203,81,
337,829,989,375,355,131,215,733,451,447,177,57,471,979,197,251,
1,771,721,1013,759,835,949,113,929,615,157,39,761,169,983,657,647,581,505,833,139,147,203,81,
337,829,989,375,365,131,215,733,451,447,177,57,471,979,197,251,
1,771,721,1013,759,835,949,113,929,615,157,39,761,169,983,657,647,581,505,833,139,147,203,81,
337,829,989,375,365,131,215,733,451,447,177,57,471,979,197,251,
1,771,721,1013,759,835,949,113,929,615,157,39,761,169,983,657,647,581,505,833,139,147,203,81,
337,829,989,375,365,131,215,733,451,447,177,57,471,979,197,251,
1,771,721,1013,759,835,949,113,929,615,157,39,761,169,983,657,647,581,505,833,139,147,203,81,
337,829,989,375,365,131,215,733,451,447,177,57,471,979,197,251,
1,771,721,1013,759,835,949,113,929,615,157,39,761,169,983,657,647,581,505,833,139,147,203,81,
337,829,989,375,365,131,215,733,451,447,177,57,471,979,197,251,
1,771,721,1013,759,835,949,113,929,615,157,39,761,169,983,657,647,581,505,833,139,147,203,81,
337,829,989,375,365,131,215,733,451,447,177,57,471,979,197,251,
1,771,721,1013,759,835,949,113,929,615,157,39,761,169,983,657,647,581,505,833,139,147,203,81,
337,829,989,375,365,131,215,733,451,447,177,57,471,979,197,251,
/*end 10 */
1,1285,823,727,267,833,471,1601,1341,913,1725,2021,1905,375,893,1599,415,605,819,975,915,1715,
1223,1367,663,629,525,469,981,1667,1587,1251,451,481,721,483,1209,1457,415,1435,
1,1285,823,727,267,833,471,1601,1341,913,1725,2021,1905,375,893,1599,415,605,819,975,915,1715,
1223,1367,663,629,525,469,981,1667,1587,1251,451,481,721,483,1209,1457,415,1435,
1,1285,823,727,267,833,471,1601,1341,913,1725,2021,1905,375,893,1599,415,605,819,975,915,1715,
1223,1367,663,629,525,469,981,1667,1587,1251,451,481,721,483,1209,1457,415,1435,
1,1285,823,727,267,833,471,1601,1341,913,1725,2021,1905,375,893,1599,415,605,819,975,915,1715,
1223,1367,663,629,525,469,981,1667,1587,1251,451,481,721,483,1209,1457,415,1435,
1,1285,823,727,267,833,471,1601,1341,913,1725,2021,1905,375,893,1599,415,605,819,975,915,1715,
1223,1367,663,629,525,469,981,1667,1587,1251,451,481,721,483,1209,1457,415,1435,
1,1285,823,727,267,833,471,1601,1341,913,1725,2021,1905,375,893,1599,415,605,819,975,915,1715,
1223,1367,663,629,525,469,981,1667,1587,1251,451,481,721,483,1209,1457,415,1435,
1,1285,823,727,267,833,471,1601,1341,913,1725,2021,1905,375,893,1599,415,605,819,975,915,1715,
1223,1367,663,629,525,469,981,1667,1587,1251,451,481,721,483,1209,1457,415,1435,
1,1285,823,727,267,833,471,1601,1341,913,1725,2021,1905,375,893,1599,415,605,819,975,915,1715,

APPENDIX-continued

```
1223,1367,663,629,525,469,981,1667,1587,1251,451,481,721,483,1209,1457,415,1435,
1,1285,823,727,267,833,471,1601,1341,913,1725,2021,1905,375,893,1599,415,605,819,975,915,1715,
1223,1367,663,629,525,469,981,1667,1587,1251,451,481,721,483,1209,1457,415,1435,
/*end 11 */
1,3855,4091,987,1839,4033,2515,579,3863,977,3463,2909,3379,1349,3739,347,387,2881,2821,1873,1959,
1929,2389,3251,1149,243,3609,1131,1701,143,1339,3497,2499,1571,983,4021,1625,3217,1163,2977
1,3855,4091,987,1839,4033,2515,579,3863,977,3463,2909,3379,1349,3739,347,387,2881,2821,1873,1959,
1929,2389,3251,1149,243,3609,1131,1701,143,1339,3497,2499,1571,983,4021,1625,3217,1163,2977
1,3855,4091,987,1839,4033,2515,579,3863,977,3463,2909,3379,1349,3739,347,387,2881,2821,1873,1959,
1929,2389,3251,1149,243,3609,1131,1701,143,1339,3497,2499,1571,983,4021,1625,3217,1163,2977
1,3855,4091,987,1839,4033,2515,579,3863,977,3463,2909,3379,1349,3739,347,387,2881,2821,1873,1959,
1929,2389,3251,1149,243,3609,1131,1701,143,1339,3497,2499,1571,983,4021,1625,3217,1163,2977
1,3855,4091,987,1839,4033,2515,579,3863,977,3463,2909,3379,1349,3739,347,387,2881,2821,1873,1959,
1929,2389,3251,1149,243,3609,1131,1701,143,1339,3497,2499,1571,983,4021,1625,3217,1163,2977
1,3855,4091,987,1839,4033,2515,579,3863,977,3463,2909,3379,1349,3739,347,387,2881,2821,1873,1959,
1929,2389,3251,1149,243,3609,1131,1701,143,1339,3497,2499,1571,983,4021,1625,3217,1163,2977
1,3855,4091,987,1839,4033,2515,579,3863,977,3463,2909,3379,1349,3739,347,387,2881,2821,1873,1959,
1929,2389,3251,1149,243,3609,1131,1701,143,1339,3497,2499,1571,983,4021,1625,3217,1163,2977
1,3855,4091,987,1839,4033,2515,579,3863,977,3463,2909,3379,1349,3739,347,387,2881,2821,1873,1959,
1929,2389,3251,1149,243,3609,1131,1701,143,1339,3497,2499,1571,983,4021,1625,3217,1163,2977
1,3855,4091,987,1839,4033,2515,579,3863,977,3463,2909,3379,1349,3739,347,387,2881,2821,1873,1959,
1929,2389,3251,1149,243,3609,1131,1701,143,1339,3497,2499,1571,983,4021,1625,3217,1163,2977
/*end 12 */
        };
        if (n < 0)   {
           for(j=12;j<=MAXBIT; j++) iv[1+j*MAXDIM]=1;    /* Initialize all direction
                                                           numbers for the first
                                                           coordinate to 1    */
           for (j=1,k=0;j<=MAXBIT;j++,k+=MAXDIM) iu[j] = &iv[k] ;
           for (k=1;k<=MAXDIM;k++)   {
              for (j=1;j<=mdeg[k] ;j++) iu[j] [k] <<= (MAXBIT-j) ;
              for (j=mdeg[k]+1;j<=MAXBIT;j++)   {
        ipp=ip [k] ;
        i=iu[-mdeg[k] ] [k] ;
        i = (i >> mdeg[k] );
        for (1=mdeg[k]-1; 1>=1;1--)   {
           if (ipp & 1) i = iu[j-1] [k];
           ipp >>= 1;
        }
        iu[j] [k]=i;
               }
           }
           fac=1.0/ (1L << MAXBIT);
           in=0;
        }
        else
           {
              /* Check if the (n-1) -th number was generated in the previous call
        to sobol. If not, update in and ix */
              if(in!=n-1)   {
unsigned long gray;
/* Set ix to 0 */
for (k=1;k<=IMIN(d,MAXDIM) ;k++) ix[k]=0;
in=n-1;
gray=in(in>>1) ;   /* Find gray code of in */
for (j=1;j<=MAXBIT;j++)   {
              if(gray&1)   {       /* Only digits which are 1 are used */
              im=(j-1) *MAXDIM;
              for (k=1;k<=IMIN(d,MAXDIM) ;k++) ix[k] = iv[im+k];
        }
              gray>>=1;
        }
              }
              im=in;                           /* Calculate the next vector in the sequence */
              for (j=1;j<=MAXBIT;j++)          {  /* Find the rightmost zero bit */
if (!(im & 1) ) break;
im >>= 1;
              }
              if (j > MAXBIT) nrerror("MAXBIT too small in sobseq") ;
              im=(j-1) *MAXDIM;
              for (k=1;k<=IMIN(d,MAXDIM) ;k++) {
ix[k] = iv[im+k] ;
x[k-1]=ix[k]*fac;
              }
              in++;
           }
}
#undef MAXBIT
#undef MAXDIM
```

APPENDIX-continued

```
/**********************************************************
    void halton (int n)
        This is the function halton for generating Halton points.
        It returns the n-th d-dimensional Halton point. The point is implicitly
        returned through the array x. The last two digits of n-1 in base p[j]
        are kept in q1[j] and q2[j]. When both digits become p[j]-1, the
        radical inverse function is computed again. That way the accumulation
        of round-off error is avoided. In practice, there are not any upper bounds
        on the values of d and n.
    **********************************************************/
extern int d;       /* actual dimension of the points */
extern int *q1, *q2;    /* q1[j] is the last digit of n-1 in base p[j], q2[j] is
                   the digit before the last one */
extern double *x;       /* This will contain the Halton point */
extern int *p;   /* the first d prime numbers */
extern int *p_1;   /* first d prime numbers minus 1 */
extern double *incr1, *incr2;    /* incr1[j] is 1/p[j] and 1/(p[j]*p[j]) */
double find_fi (int p, int n);    /* See below */
void halton(int n)
{
    double a;
    int j,nn;
    static int ins_n;    /* The default value of ins_n is 0 */
    /* Check if the (n-1) -th number was generated in the previous call
        to halton. If not, update q1, q2, and x */
    if(ins_n!=n-1)
        {
          ins_n=n-1;
          for (j=0; j<d; j++)
        {
          q1[j]=ins_n % p[j];
          q2[j]=(ins_n/p[j]) % p[j];
          x[j]=find_fi(p[j],ins_n);
        }
          ins_n++;
        }
    for(j=0;j<d[j++)
        {
          if(q1[j]<p_1[j])
        {
        /* It is easy to update when the last digit is less than p[j]-1 */
        q1[j]++;
        x[j]=x[j]+incr1[j])
        {
        else if(q2[j]<p_1[j])
        {
        /* This is the case when the last digit is p[j]-1 and the digit
            before the last one is less than p[j]-1 */
        q1[j]=0;
        q2[j]++;
        x[j]=x[j]+incr1[j]+incr2[j]-1.0;
        }
          else
        {
        /* This the case when the last digit is p[j]-1 and the digit
            before the last one is also p[j]-1 */
        q1[j]=0;
        q2[j]=0;
        nn=n/(p[j] *p[j]);
        a=nn % p[j];
        nn=n/p[j];
        if(nn) x[j]=(a+find_fi(p[j],nn) ) *incr2[j]*incr1[j];
        else x[j]=a*incr2[j]*incr1[j];
        }
        }
}
/**********************************************************
    find_fi(int p, int n)
    This returns the radical inverse function fi(p,n) at n for the prime p.
    **********************************************************/
double find_fi(int p, int n)
{
int p2,nn;
double s,fi,incr;
incr=1.0/p;
p2=p*p;
nn=n/p2;
fi=0.0;
s=incr;
```

APPENDIX-continued

```
    while (nn > 0)
      {
        fi+= (nn % p) *s;
        nn=nn/p;
        s*=incr;
      }
/* The two largest components of fi are added later to avoid possible
loss of precision */
fi=( (n/p % p)+ fi) / p2;
fi+=(n % p) / (double) p;
return fi;
}
```

We claim:

1. A method for structuring a portfolio, comprising:
   (i) calculating, by computer, a number of potential-loss function values at points in a domain of stochastic market factors, the points being obtained from a low-discrepancy deterministic sequence;
   (ii) determining a cumulative distribution function of the function values;
   (iii) determining value at risk as one of the function values corresponding to a specified level of confidence; and
   (iv) structuring the portfolio depending on a comparison of the value at risk with a specified target value.

2. The method according to claim 1, wherein determining the cumulative distribution function comprises sorting the function values.

3. The method according to claim 1, wherein the number of function values is predetermined.

4. The method according to claim 1, wherein the number of function values is determined automatically.

5. The method according to claim 1, wherein calculating comprises allocating function evaluations among a plurality of processors.

6. The method according to claim 1, wherein the low-discrepancy deterministic sequence is selected from the group consisting of Sobol point sequence, Halton point sequence, Hammersley point sequence, hyperbolic-cross point sequence and generalized Faure sequence.

7. A system for structuring a portfolio, comprising:
   (i) means for calculating a number of potential-loss function values at points in a domain of stochastic market factors, the points being obtained from a low-discrepancy deterministic sequence;
   (ii) means for determining a cumulative distribution function of the function values;
   (iii) means for determining value at risk as one of the function values corresponding to a specified level of confidence; and
   (iv) means for structuring the portfolio depending on a comparison of the value at risk with a specified target value.

8. The system according to claim 7, wherein the means for determining the cumulative distribution function comprises means for sorting the function values.

9. The system according to claim 7, wherein the number of function values is predetermined.

10. The system according to claim 7, wherein the means for calculating comprises means for determining the number of function values.

11. The system according to claim 7, wherein the means for calculating comprises means for allocating function evaluations among a plurality of processors.

12. The system according to claim 7, wherein the low-discrepancy deterministic sequence is selected from the group consisting of Sobol point sequence, Halton point sequence, Hammersley point sequence, hyperbolic-cross point sequence and generalized Faure sequence.

13. A computer program product embodied on a computer readable medium, having stored thereon:
   (i) instructions for calculating potential-loss function values at points in a domain of stochastic market factors, the points being obtained from a low-discrepancy deterministic sequence;
   (ii) instructions for determining a cumulative distribution function of the function values;
   (iii) instructions for determining value at risk as one of the function values corresponding to a specified level of confidence; and
   (iv) instructions for structuring the portfolio depending on a comparison of the value at risk with a specified target value.

14. The computer program product according to claim 13, wherein the instructions for determining the cumulative distribution function include instructions for sorting the function values.

15. The computer program product according to claim 13, wherein the number of function values is predetermined.

16. The computer program product according to claim 13, further including instructions for determining the number of function values.

17. The computer program product according to claim 13, wherein the instructions for calculating include instructions for allocating function evaluations among a plurality of sub-processors.

18. The computer program product according to claim 13, wherein the low-discrepancy deterministic sequence is selected from the group consisting of Sobol point sequence, Halton point sequence, Hammersley point sequence, hyberbolic-cross point sequence and generalized Faure sequence.

* * * * *